United States Patent
Jia et al.

(10) Patent No.: US 11,302,014 B2
(45) Date of Patent: Apr. 12, 2022

(54) METHODS OF SEGMENTING AN ABDOMINAL IMAGE, COMPUTER APPARATUSES, AND STORAGE MEDIUMS

(71) Applicants: SHANGHAI SIXTH PEOPLE'S HOSPITAL, Shanghai (CN); SHANGHAI JIAO TONG UNIVERSITY, Shanghai (CN)

(72) Inventors: Weiping Jia, Shanghai (CN); Bin Sheng, Shanghai (CN); Huating Li, Shanghai (CN); Siyuan Pan, Shanghai (CN); Xuhong Hou, Shanghai (CN); Liang Wu, Shanghai (CN)

(73) Assignees: SHANGHAI SIXTH PEOPLE'S HOSPITAL, Shanghai (CN); SHANGHAI JIAO TONG UNIVERSITY, Shanghai (CN)

(*) Notice: Subject to any disclaimer, the term of this patent is extended or adjusted under 35 U.S.C. 154(b) by 432 days.

(21) Appl. No.: 16/471,819

(22) PCT Filed: Nov. 16, 2018

(86) PCT No.: PCT/CN2018/115798
§ 371 (c)(1),
(2) Date: Jun. 20, 2019

(87) PCT Pub. No.: WO2020/093435
PCT Pub. Date: May 14, 2020

(65) Prior Publication Data
US 2021/0366125 A1    Nov. 25, 2021

(30) Foreign Application Priority Data
Nov. 8, 2018   (CN) .......................... 201811324901.0

(51) Int. Cl.
*G06K 9/00*   (2006.01)
*G06T 7/174*  (2017.01)
(Continued)

(52) U.S. Cl.
CPC .............. *G06T 7/174* (2017.01); *G06K 9/628* (2013.01); *G06K 9/6228* (2013.01);
(Continued)

(58) Field of Classification Search
CPC .......... G06K 9/66; G06K 9/4628; G06K 9/32; G06K 9/2013; G06K 9/344; G06K 9/38;
(Continued)

(56) References Cited

U.S. PATENT DOCUMENTS 9,538,925 B2 *   1/2017   Sharma ................... G16H 50/20
10,140,544 B1 *  11/2018  Zhao ....................... G06T 7/143
(Continued)

FOREIGN PATENT DOCUMENTS

CN   105894517 A   8/2016
CN   107316307 A   11/2017
(Continued)

OTHER PUBLICATIONS

International Search Report from International Application No. PCT/CN2018/115798 dated Jul. 29, 2019.

*Primary Examiner* — Amir Alavi
(74) *Attorney, Agent, or Firm* — Dorsey & Whitney LLP (57) ABSTRACT

Methods of segmenting an abdominal image, computer apparatuses and storage mediums. The method includes acquiring an abdominal image to be examined; and classifying pixels in the abdominal image to be examined based on a trained full convolution neural network, and determining a segmented image corresponding to the abdominal image to be examined, wherein the trained full convolution neural network is trained and determined based on a first
(Continued)

training set and a second training set, the first training set includes first sample abdominal images and pixel classification label images corresponding to the first sample abdominal images, the second training set includes second sample abdominal images and the number of pixels of second sample abdominal images correspondingly belong to each class. Through the methods herein, the accuracy of the segmentation can be improved.

17 Claims, 4 Drawing Sheets

(51) Int. Cl.
*G06K 9/62* (2022.01)
*G06N 3/08* (2006.01)
*G06T 3/00* (2006.01)

(52) U.S. Cl.
CPC ......... *G06K 9/6261* (2013.01); *G06K 9/6268* (2013.01); *G06N 3/08* (2013.01); *G06T 3/0006* (2013.01); *G06T 2207/20081* (2013.01); *G06T 2207/20084* (2013.01); *G06T 2207/30004* (2013.01)

(58) Field of Classification Search
CPC ............ G06K 9/4652; G06K 9/00718; G06K 9/00797; G06K 9/6228; G06K 9/6261; G06T 7/0012; G06T 7/0083; G06T 7/0081; G06T 7/408; G06T 2207/30004; G06T 2207/0024; G06T 2207/20144; G06T 2207/10016; G06F 17/30257; G06F 17/3024; G06F 19/321; H04N 1/40062
See application file for complete search history.

(56) References Cited

U.S. PATENT DOCUMENTS

| | | | |
|---|---|---|---|
| 10,340,044 B2 * | 7/2019 | Yao | A61B 6/4233 |
| 10,452,957 B2 * | 10/2019 | Kitamura | G06K 9/4628 |
| 10,706,545 B2 * | 7/2020 | Laserson | G06T 7/0016 |
| 10,803,591 B2 * | 10/2020 | Wong | G06N 3/0454 |
| 10,849,587 B2 * | 12/2020 | Weiss | G06K 9/628 |
| 10,878,219 B2 * | 12/2020 | Zhou | G06N 3/0445 |
| 10,891,731 B2 * | 1/2021 | Brestel | G16H 30/20 |
| 2016/0106347 A1 * | 4/2016 | Patwardhan | A61B 5/0263 |
| | | | 600/410 |
| 2021/0241109 A1 * | 8/2021 | Jie | G06N 3/08 |

FOREIGN PATENT DOCUMENTS

| | | |
|---|---|---|
| CN | 108305260 A | 7/2018 |
| CN | 108335303 A | 7/2018 |
| CN | 108765412 A | 11/2018 |
| CN | 108765423 A | 11/2018 |

* cited by examiner

METHODS OF SEGMENTING AN ABDOMINAL IMAGE, COMPUTER APPARATUSES, AND STORAGE MEDIUMS

CROSS-REFERENCE TO RELATED APPLICATIONS

This application is a U.S. National Stage Application of PCT International Application No. PCT/CN2018/115798 entitled "METHODS OF SEGMENTING AN ABDOMINAL IMAGE, COMPUTER APPARATUSES, AND STORAGE MEDIUMS" filed on Nov. 16, 2018, which claims priority to Chinese Patent Application No. 2018113249010 entitled "METHODS OF SEGMENTING AN ABDOMINAL IMAGE, COMPUTER APPARATUSES, AND STORAGE MEDIUMS" filed on Nov. 8, 2018, the entire contents of each of the foregoing applications are incorporated herein by reference.

TECHNICAL FIELD

The present disclosure relates to the field of medical technology, and in particular, to methods of segmenting an abdominal image, computer apparatuses and storage mediums.

BACKGROUND

Human fat can be divided into subcutaneous fat and intra-abdominal fat. Determining the content of subcutaneous fat and intra-abdominal fat in human body is an important indicator of people's health and a reference indicator for some diseases, such as diabetes. At present, there are mainly two approaches of fat segmentation for MRI (magnetic resonance imaging) abdominal image: the first is manual fat segmentation by people with relevant medical knowledge; and the second is to segment the abdominal fat by computer algorithm.

However, since intra-abdominal fat is often similar to some non-fat regions in gray scale, they are not easily distinguished by the first approach, which leads to low segmentation accuracy. The defect of the second approach is that the quality of the image segmented by the algorithm is determined by the quality of the image and is overly dependent on the gray scale information, the image cannot be segmented well, which results in the low accuracy of the segmentation result.

SUMMARY

Based on various embodiments of the present disclosure, methods of segmenting an abdominal image, computer apparatuses and storage mediums are provided.

A method of segmenting an abdominal image includes:
acquiring an abdominal image to be examined; and
classifying pixels in the abdominal image to be examined based on a trained full convolution neural network, and determining a segmented image corresponding to the abdominal image to be examined, the trained full convolution neural network is trained and determined based on a first training set and a second training set, the first training set includes first sample abdominal images and pixel classification label images corresponding to the first sample abdominal images, the second training set includes second sample abdominal images and the number of pixels of second sample abdominal images correspondingly belong to each class.

A computer apparatus includes a memory and a processor, the memory stores computer-executable instructions that, when executed by the processor, causing the processor to perform the steps of:
acquiring an abdominal image to be examined; and
classifying pixels in the abdominal image to be examined based on a trained full convolution neural network, and determining a segmented image corresponding to the abdominal image to be examined, the trained full convolution neural network is trained and determined based on a first training set and a second training set, the first training set includes first sample abdominal images and pixel classification label images corresponding to the first sample abdominal images, the second training set includes second sample abdominal images and the number of pixels of second sample abdominal images correspondingly belong to each class.

One or more non-transitory storage medium storing computer-executable instructions that, when executed by one or more processors, cause the one or more processors to perform the steps of:
acquiring an abdominal image to be examined; and
classifying pixels in the abdominal image to be examined based on a trained full convolution neural network, and determining a segmented image corresponding to the abdominal image to be examined, the trained full convolution neural network is trained and determined based on a first training set and a second training set, the first training set includes first sample abdominal images and pixel classification label images corresponding to the first sample abdominal images, the second training set includes second sample abdominal images and the number of pixels of second sample abdominal images correspondingly belong to each class.

The details of one or more embodiments of the application are set forth in the accompanying drawings and the description below. Other features and advanlabeles of the application will be apparent from the description, drawings, and claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the technical solution and advantages of the present disclosure will be more apparent. It should be understood that the particular embodiments are described for the purpose of illustrating rather than restricting the present disclosure.

Figure 1:
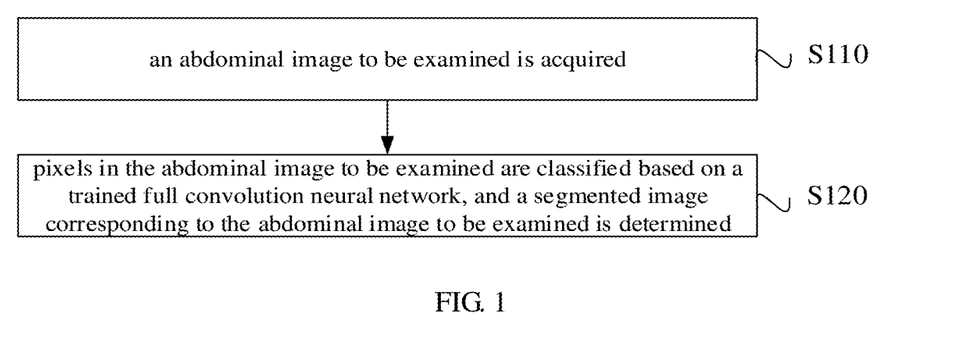
FIG. 1 is a flow chart of a method of segmenting an abdominal image according to an embodiment.

As shown in FIG. 1, in an embodiment, a method of segmenting an abdominal image is provided. This embodiment is illustrated primarily by the application of the method to a computer apparatus (i.e., the method may be implemented by the computer apparatus). The method of segmenting an abdominal image specifically includes the following steps:

In step S110, an abdominal image to be examined is acquired.

To segment the abdominal image to be examined, the pixels in the abdominal image need to be classified, that is, the class of each pixel is determined, and the abdominal image to be examined needs to be acquired first. In an example, the abdominal image to be examined is an abdominal MRI image of the user to examine.

In step S120, pixels in the abdominal image to be examined are classified based on a trained full convolution neural network, and a segmented image corresponding to the abdominal image to be examined is determined.

The trained full convolution neural network is trained and determined based on a first training set and a second training set. The first training set includes first sample abdominal images and pixel classification label images corresponding to the first sample abdominal images. The second training set includes the second sample abdominal images and the number of pixels of second sample abdominal images correspondingly belong to each class.

The trained full convolution neural network is pre-determined, the pixels in the abdominal image to be examined can be classified using the trained full convolution neural network to realize image segmentation, and determine a segmented image corresponding to the abdominal image to be examined. For example, if the abdominal image is an image having M rows and N columns, there are M*N pixels in the abdominal image. In the segmentation process, the M*N pixels need to be classified to determine a class of each pixel. Each pixel may be assigned a value corresponding to its class, and the values corresponding to pixels of the same class are the same, thereby realizing segmentation of the image. In an embodiment, the abdominal image of the first sample and the abdominal image of the second us are both abdominal MRI images.

In the embodiment, two different training sets, i.e., a first training set and a second training set, are utilized during the network training. The first training set includes pixel classification label images corresponding to the first sample abdominal images, and the second training set does not include the pixel classification label images corresponding to the second sample abdominal images, but includes the number of pixels of second sample abdominal images correspondingly belong to each class. For example, the second training set includes the abdominal images of the second sample user A and the abdominal images of the second sample user B, and further includes the number of pixels belonging to each class in the abdominal image of the second sample user A (e.g., the classes include a first class, a second class, and a third class, the number of pixels belonging to the first class in the pixels in the abdominal image of the second sample user A is S1, the number of pixels belonging to the second class is S2, and the number of pixels belonging to the third class is S3) and the number of pixels belonging to each class in the abdominal image of the second sample user B.

In an embodiment, the classes include an intra-abdominal fat class, a subcutaneous fat class, and a background class. The number of pixels of second sample abdominal images correspondingly belong to each class is the number of pixels correspondingly belong to the intra-abdominal fat class, the subcutaneous fat class, and the background class, respectively. That is, in the embodiment, the pixels in the abdominal image are classified into intra-abdominal fat, subcutaneous fat, and background, and the abdominal image is divided into intra-abdominal fat, subcutaneous fat, and background.

In the method of segmenting an abdominal image, the abdominal image to be examined is segmented by the trained full convolution neural network to obtain a segmented image, and the image can be effectively segmented. The trained full convolution neural network is trained and determined by two different training sets, i.e., based on the first training set and the second training set. The first training set includes the first sample abdominal images and pixel classification label images (the size is the same as the abdominal image size, and each value in the pixel classification label image corresponds to the classification label of the corresponding pixel of the abdominal image) corresponding to the first sample abdominal images. The second training set includes second sample abdominal images and the number of pixels of second sample abdominal images correspondingly belong to each class, the trained full convolution neural network training is determined by training with different training sets, thereby improving the accuracy of the full convolution neural network, and further improve the accuracy of abdominal image segmentation.

In an embodiment, the determining the trained full convolution neural network includes: acquiring the first training set and the second training set; initializing and obtaining the initial full convolution neural network, the initial full convolution neural network includes a convolution layer and a classification layer; and training the initial full convolution neural network based on the first training set and the second training set to obtain the trained full convolution neural network.

That is, the abdominal image in the training set is inputted to the convolution layer for convolution processing, and the convolution layer performs convolution processing and outputs the result to the classification layer. The convolution result obtained by convoluting the abdominal image by the convolution layer of the full convolution neural network is a feature image (i.e., a convolution image), and the classification layer performs classification to obtain a training pixel classification label image corresponding to the abdominal image.

In training the initial full convolution neural network based on the first training set, the initial full convolution neural network is updated according to the first training error. The first training error is determined according to a training pixel classification label image that is outputted from a classification layer by inputting a first sample abdominal image into the initial full convolution neural network and a pixel classification label image of the first sample abdominal image.

In training the initial full convolution neural network based on the second training set, the initial full convolution neural network is updated according to the second training error. The second train error is determined according to an output of a training convolution image through a fully connected layer and outputted from the convolution layer by inputting the second sample abdominal image in the second training set into the initial full convolution neural network and the number of pixels of the second sample abdominal images correspondingly belong to each class.

The parameters, such as weights and offsets, are included in the convolution neural network, and the training process is to update these parameters constantly, so as to update the convolution network. It will be appreciated that updating the initial full convolution neural network is to update the parameters in the initial full convolution neural network. After the training, the obtained parameters are up-to-date, i.e., the parameters in the trained convolutional neural network are up-to-date.

Since the contents of the first training set and the second training set are different, the data on which the convolution neural network updates are different in the training process. For example, in training the initial full convolution neural network using the first training set, the initial full convolution neural network is updated according to the first training error. Since the first training set includes pixel classification label images corresponding to the first sample abdominal images, i.e., a classification label for each of the pixel, the initial full convolution neural network performs convolution processing on the first sample abdominal images and classification to obtain training pixel classification label image, however, there may be a difference between the training pixel classification label image and the pixel classification label image corresponding to the first sample abdominal image. The first training error is determined according to a training pixel classification label image that is outputted from a classification layer by inputting a first sample abdominal image into the initial full convolution neural network and a pixel classification label image of the first sample abdominal image. The first training error represents a difference between the training pixel classification label image and the pixel classification label image.

In the process of training the initial full convolution neural network using the second training set, the initial full convolution neural network is updated according to the second train error. Since the second training set includes the second sample abdominal image and the number of pixels belonging to each class in the second sample abdominal image, the convolution result after convolution processing of the second sample abdominal image by the initial full convolution neural network passes through the fully connected layer. The output of the convolution result processed by the fully connected layer may be different from the number of pixels belonging to each class in the second sample abdominal image. The second train error is determined by inputting the second sample abdominal image in the second training set into the initial full convolution neural network, a training convolution image is then outputted from the convolution layer, the training convolution image is regarded as the input to the fully connected layer. The number of training pixels belonging to each class of the second sample abdominal images may be different from the number of pixels belonging to each class in the second sample abdominal image, and the second training error represents the difference between the number of training pixels belonging to each class and the number of pixels belonging to each class.

In an example, the fully connected layer includes three nodes corresponding to the number of classes, each node corresponding to a respective class, and the fully connected layer may output three values, i.e., correspondingly to the numbers of pixels belonging to each of the classes.

In an embodiment, the step of the step of training the initial full convolution neural network based on the first training set and the second training set to obtain the trained full convolution neural network includes: determining first training subsets based on the first training set and determining second training subsets based on the second training set; and selecting alternately an untrained standard training subset from the first training subsets and the second training subsets, training the initial full convolution neural network based on the standard training subsets, and obtaining the trained full convolution neural network.

The standard training subsets selected in adjacent two rounds are respectively from different training sets, it is understood that when the standard training subset selected in the former round is from the first training set (i.e., from the first training subsets), the standard subset selected in the latter round is from the second training set (i.e. from the second training subsets), and when the standard training subset selected in the former round is from the second training set (i.e., from the second training subsets), the standard subset selected in the latter round is from the first training set (i.e. from the first training subsets).

That is, in the training process, the first training subset and the second training subset are used for training alternatively, instead of continuously using the first training subset for training or continuously using the second training subset training. For example, one training subset of the first training subsets can be used for training, then one training subset of the second training subsets can be used for training, then one untrained training subset of the first training subset can be used for training, and then an untrained training subset of the second training subsets is used for training, and the training of the initial full convolution neural network is realized by successive cyclic selection as such.

In an embodiment, the obtaining the trained full convolution neural network includes: selecting a training subset from the first training subsets as a standard training subset; training the initial full convolution neural network based on the standard training subset, and updating the initial full convolution neural network; when the network training stop condition is not satisfied, selecting an untrained training subset from the first training set, the second training set, and a training set other than the training set to which the standard training subset belongs as a standard training subset, returning to the step of training the initial full convolution neural network based on the standard training subset, updating the initial full convolution neural network, until the network training stop condition is satisfied, and regarding the updated initial full convolution neural network as the trained full convolution neural network.

For example, the first training subsets in the first training set includes J11, J12, J13, and J14, and the second training subsets in the second training set includes J21, J22, J23, and J24. First, one of the training subsets J11, J12, J13, and J14 may be arbitrarily selected as the standard training subset, for example, the training subset J11 may be selected as the standard training subset. In J11, at least a part of the first sample abdominal images of the first sample users and the correspond pixel classification label images are included, then J11 is inputted to the initial full convolution neural network for training, i.e., the initial full convolution neural network is updated. At this time, if the network training stop condition is not satisfied, it is necessary to select a untrained training subset as the standard training subset from the second training set other than the first training set to which J11 belongs, that is, the standard training subset is updated. For example, an untrained training subset may be arbitrarily selected from the training subsets J21, J22, J23, and J24 as the standard training subset. For example, J21 may be selected as the new standard training subset, the updated initial full convolution neural network is trained again using the updated standard training subset J21, and the initial full convolution neural network is updated again. At this time, when the network training stop condition is satisfied, in the first training set and the second training set, it is necessary to select one untrained training subset as the standard training subset from the first training set other than the second training set to which J21 belongs, the first training set and the second training set, that is, the standard training subset is updated. Having been trained with J11, a training subset may be arbitrarily selected from J12, J13, and J14 as the standard training subset. For example, J12 may be selected as the new standard training subset, the updated initial full convolution neural network is trained again using the updated standard training subset J12, and the initial full convolution neural network is updated again. Thus, the training subsets are cyclically selected for network training, and the training is stopped when the network training stop condition is satisfied, and the updated initial full convolution neural network obtained at this time is the above-described trained full convolution neural network.

In an example, when the number of iterations exceed a preset number, it indicates that the network training stop condition is satisfied, the number of iterations is zero at the initial time (i.e., the training has not yet started), and after an training of the initial full convolution neural network by a standard training subset, the number of iterations is increased by one.

In an embodiment, after updating the initial full convolution neural network and before satisfying the network training stop condition, the method further includes marking the standard training subset as trained; marking respectively the first training subsets as untrained when the first training subsets are respectively marked as trained; and marking respectively the second training subsets as untrained when the second training subsets are respectively marked as trained.

As the first training subsets or the second training subsets have trained the network before the training stop condition is satisfied, i.e. each of the first training subsets has been marked as trained or each of the second training subsets has been marked as trained. Still, when the training stop condition is not satisfied at this time, i.e., the train is not to be stopped, when each first training subset is respectively marked as trained, each first training subset is respectively marked as untrained, and when each second training subset is respectively marked as trained, each second training subsets is respectively marked as untrained. In this way, it is possible to ensure that a training subset is available before the training stop condition is satisfied, thereby ensuring normal training of the network.

For example, the network has been trained by J11, J12, J13 and J14 in the first training subsets, i.e. they are all marked as trained, at this time no untrained training subset is available in the first training subsets, the next normal network training is affected, then the J11, J12, J13 and J14 may be re-marked as untrained, and any one of them may be selected as the standard training subset for the next network training. The network has been trained by J21, J22, J23 and J24 in the second training subsets, i.e. they are all marked as trained, at this time no untrained training subset is available in the second training subsets, the next normal network training is affected, then the J21, J22, J23 and J24 may be re-marked as untrained, and any one of them may be selected as the standard training subset for the next network training.

In an embodiment, when the network training stop condition is not satisfied, and in the first training set and the second training set, before selecting an untrained training subset as the standard training subset in the training set outside the training set to which the standard training subset belongs, the method further includes acquiring a training error of the initial full convolution neural network; adjusting a learning rate of the initial full convolution neural network when the training error is greater than a preset error. When the standard training subset is the first training subset, the training error may be the sum of the first training errors corresponding to the first sample abdominal images, that is, the training error is the sum of the first training errors. When the standard training subset is the second training subset, the training error may be the sum of the second training errors corresponding to the second sample abdominal images, that is, the training error is the sum of the second training errors. That is, in this embodiment, in the network training process, the learning rate of the network can also be adjusted according to the error, so that the network training can be more accurate.

In an embodiment, the acquiring the first training set includes acquiring first sample original abdominal gray scale images and pixel classification label images corresponding to the first sample original abdominal gray scale images; transforming the first sample original abdominal gray scale images to obtain first gray scale transformed images, and performing the same transformation to the pixel classification label images corresponding to the first sample original abdominal images, and obtaining pixel classification label transformed images corresponding to the first gray scale transformed images; and generating the first training set based on the first sample original abdominal gray scale images, the pixel classification label images corresponding to the first sample original abdominal gray scale images, the first gray scale transformed images, and the pixel classification label transformed images corresponding to the first gray scale transformed images.

That is, the pixel classification label images corresponding to the first sample original abdominal gray scale images are transformed in the same manner as the first sample original abdominal gray scale images to ensure that the pixel classification label transformed images correspond to the first gray scale transformed images. It can be understood that in the embodiment, the first sample abdominal images in the first training set include the first sample original abdominal gray scale images and the first gray scale transformed images. The transformation may include flipping or rotating so that the number of training sample images may be increased based on the first sample original abdominal gray scale image. In the embodiment, the first sample original abdominal gray scale image is an MRI image.

In an embodiment, the generating the first training set includes: acquiring first channel images of each of the first sample original abdominal gray scale images on each of color channels and a second channel images of each of the first gray scale transformed images on each of the color channels; normalizing the first channel images and the second image channel images to determine first normalized channel images and second normalized channel images; and generating the first training set based on the first normalized channel images and the second normalized channel images.

In the embodiment, the color channels may include an R color channel, a G color channel, and a B color channel. It will be appreciated that in this embodiment, the first sample abdominal images in the generated first training set include first normalized images of the first sample abdominal gray scale images on the color channels and second normalized images of the first gray scale transformed images on the color channels. In an example, each of the first channel images and the second graph channel images may be respectively normalized according to a preset variance and a mean value, so as to ensure that the pixel values in the obtained first normalized channel images and the second normalized channel images meet preset requirements. That is, in the embodiment, the first sample abdominal images in the first training set includes the first normalized channel images and the second normalized channel images.

In an embodiment, the acquiring the second training set includes acquiring second sample original abdominal gray scale images and the number of pixels of second sample abdominal images correspondingly belong to each class; transforming the second original abdominal gray scale images to obtain the second gray scale transformed images; generating the second training set based on the second sample original abdominal gray scale images, the second gray scale transformed images, and the number of pixels of second sample abdominal images correspondingly belong to each class.

That is, the second sample abdominal images in the generated second training set include second sample original abdominal gray scale images and corresponding second gray scale transformed images.

In an embodiment, the generating the second training set includes: acquiring third channel images of the second sample original abdominal gray scale images on the color channels and fourth channel images of the second gray scale transformed images on color channels; normalizing the second channel images and the second image channel images to determine third normalized channel images and fourth normalized channel images; generating the second training set based on the third normalized channel images and the fourth normalized channel images.

That is, in the embodiment, the second sample abdominal images in the second training set includes the third normalized channel images and the fourth normalized channel images.

In an embodiment, before training the initial full convolution neural network to obtain the trained full convolution neural network based on the first training set and the second training set, the method further includes: determining squares corresponding to the first sample abdominal images based on the first sample abdominal images in the first training set; regarding an intersection point of four squares corresponding to the first sample abdominal image as a movable point; moving the movable points, updating the squares to obtain quadrilaterals; performing affine transformation to the regions of the first sample abdominal image in each of the quadrilateral respectively to obtain affine sub-graphs; joining the affine sub-graphs to obtain an updated first sample abdominal image; and updating the first training set based on the updated first sample abdominal images.

The first sample abdominal image is segmented to determine the squares. In the embodiment, the first sample abdominal image can be segmented based on each row segmentation line along the row direction of the image and each column segmentation line along the column direction of the image to obtain the squares (i.e., square squares). That is, the size of combination of the squares is the same as that of the first sample abdominal image. It will be appreciated that the row segmentation line may be an row in the first sample abdominal image and the column segmentation line may be an column in the first sample abdominal image.

There is a coincidence line between two adjacent squares, which belongs to a row division line or a column division line. Thus, when there is an intersection point between four squares, the intersection point must be a point of the coincidence lines between every two of the four squares, specifically, it is the intersection point of the coincidence lines between every two of the four squares. Each intersection point in the first sample abdomen image is regarded as a movable point, and then each movable point is moved based on a preset movement rule, that is, each intersection point is moved, the shape corresponding to each square is changed accordingly. In the process of moving the intersection point, the shape of each square can be updated to obtain each quadrilateral. In an example, the movement is a random movement, and the distance of movement is within a preset distance range, i.e., the preset movement rule is a rule of moving within a preset distance range. For example, the distance between two adjacent movable points is 100, and the range in which each movable point can be moved is 30, that is, the preset distance range indicates a range in which the distance from the movable point is 30.

Each of the first abdominal images is subjected to the above-described process, and updating of the squares of each of the first sample abdominal images is achieved. Then, affine transformation is performed on each region of the first sample abdominal image in each quadrilateral to obtain affine sub-graphs, and the image data is augmented, and the affine sub-graphs corresponding to the first sample abdominal image are joined to obtain a updated first sample abdominal image, and the first training set is updated based on the updated first sample abdominal images, that is, the updated first training set includes the updated first sample abdominal images, the training is subsequently performed using the updated first training set.

In an embodiment, before training the initial full convolution neural network to obtain the trained full convolution neural network based on the first training set and the second training set, the method further includes:

determining segmentation squares corresponding to the second sample abdominal images based on the second sample abdominal images in the second training set; regarding an intersection point of four segmentation squares corresponding to the second sample abdominal image as a movable point;

moving the movable points, updating the segmentation squares to obtain segmentation quadrilaterals;

performing affine transformation to the regions of the second sample abdominal image in each of the segmentation quadrilaterals respectively to obtain abdominal affine sub-graphs;

joining the affine sub-graphs to obtain an updated second sample abdominal image; and updating the second training set based on the updated second sample abdominal images.

The segmentation squares can be determined by segmenting the second sample abdominal image, and the process is similar to the above-described segmentation process for the first sample abdominal image. The updated second training set includes updated second sample abdominal images, the training is subsequently performed using the updated second training set.

The method of segmenting an abdominal image will be described in detail with a specific embodiment. The specific process is as follows:

The images may be proportionally classified into training images, verification images, and test images by 7:2:1.

Figure 2:
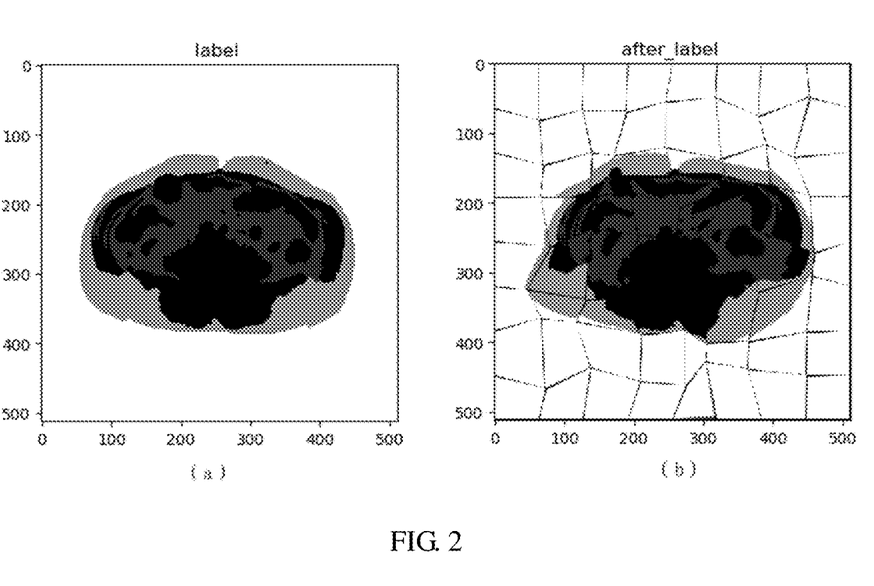
FIG. 2 is a schematic diagram of an affine transformation of a method of segmenting an abdominal image according to an embodiment.

In the process of segmenting the abdominal image to be examined, the trained full convolution neural network needs to be utilized. The process of determining the trained full convolution neural network as follows:

First, the image is pre-processed, that is, the original image is randomly flipped or rotated, and the image is cut into 8*8 squares, and each square becomes a convex quadrilateral by moving 49 intersections (intersections of every four squares) in the squares. Then, affine transformation is performed on the corresponding pixels of the image in each convex quadrilateral. The purpose is to extract the texture information for the abdominal fat image, it is very important to extract the texture information, but because of the shortage of the data amount, a linear transformation of the image alone will not facilitate the extraction of the texture information, and certain appropriate transformation can effect data augmentation. As shown in FIG. 2, FIG. 2(a) is a single pixel classification label image, and FIG. 2(b) is an image obtained by performing affine transformation to regions of the pixel classification label image in each convex quadrilateral in FIG. 2(a). In addition, it is also possible to change the transformed image from a single channel to three channels (color channels), provide a variance and a mean value, and normalize the pixel values of the image of each channel. Finally a first training set and a second training set are generated, the first training set includes first sample abdominal images (e.g., 300 pieces) and pixel classification label images corresponding to the first sample abdominal images. The second training set includes the second sample abdominal images (e.g., 9000 pieces) and the number of pixels of second sample abdominal images correspondingly belong to each class.

Then the initial full convolution neural network can be initialized and obtained. In the initial full convolution neural network, the configuration parameter of the network are: the learning rate is 0.001, the learning rate adopts a gradient descent strategy, and the configuration parameter gamma is 0.1, the step size is 1500, the impulse momentum is 0.9, and the maximum number of iterations (i.e., the preset number of iterations) is 50000, and 32 images are inputted as a sequence for each training. In the embodiment, the train code adopts a pytorch depth learning framework, a multi-label input layer and a multi-label sigmoid cross-entropy function layer in a DRML public code are added, compiled in the Ubuntu system, with the algorithm network parameters configured for training.

Figure 3:
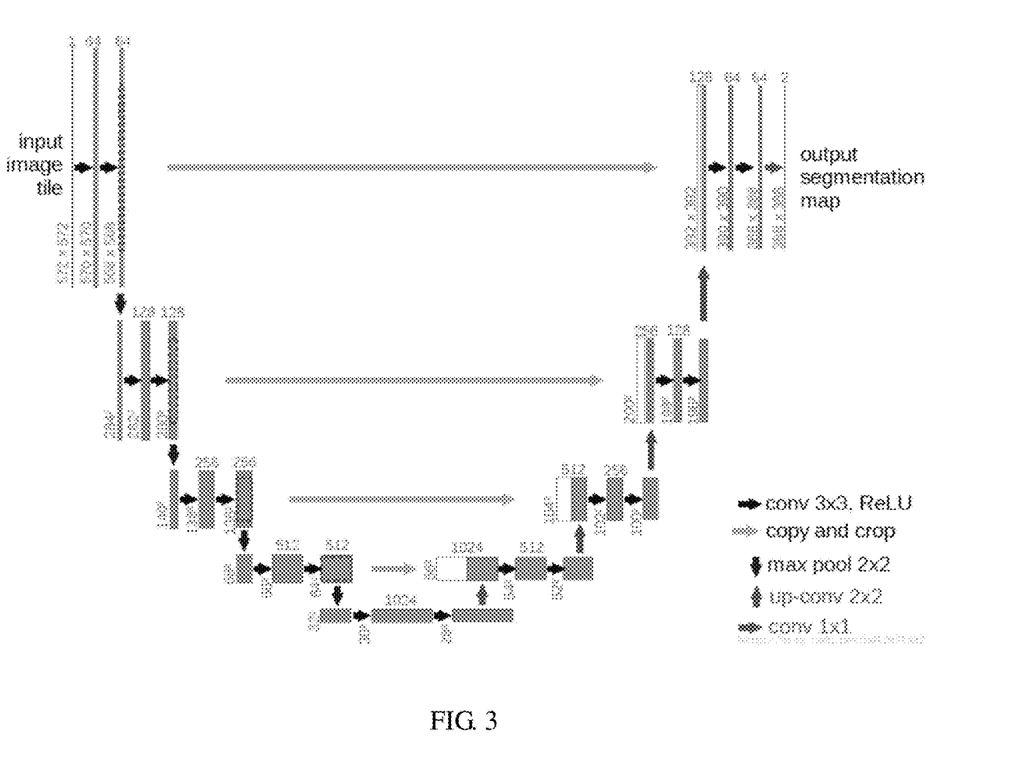
FIG. 3 is a schematic diagram of a full convolutional neural network according to another embodiment.

As shown in FIG. 3, which is a schematic diagram of a full convolution neural network, the image is gradually reduced after four convolution, pooling and normalization operations on the left side of the full convolution neural network. After that, after deconvolution, pooling and normalization operations, the image is gradually increased. Before each deconvolution, the network makes a connection on the channel between the image passed from the previous layer and the previous convolution image of the same size. The purpose of this is to extract the detailed features of the semantic segmentation while also taking into account the overall information. After the last convolution layer, the softmax layer (classification layer) is connected, a fully connected layer can be additionally connected, three neurons (nodes) are outputted, respectively corresponding to the numbers of pixels of subcutaneous fat, intra-abdominal fat, and background.

Specifically, after the left side of the full convolution neural network is subjected to four convolution, pooling and normalization operations, the image is gradually reduced. On the right, after deconvolution, pooling, and normalization operations, the image is gradually increased. Before each deconvolution, the full convolution neural network makes a connection on the channel between the image transmitted from the previous layer and the previous convolution image of the same size. The purpose of this is to extract the detailed features of the semantic segmentation while also taking into account the overall information.

Next, the first training subsets corresponding to the first training set are determined, and the second training subsets corresponding to the second training set are determined. In particular, a preset number (e.g., 32) of first sample abdominal images and corresponding pixel classification label images may be selected from the first training set as a first train subset, the union of the first training subsets being the first training set, and the intersection being empty. A preset number of second sample abdominal images and the number of pixels thereof belonging to each class may be selected from the second training set as a second training subset, the union of the second training subsets being the second training set, and the intersection being empty. A training subset is select alternately from the first training set and the second training set as a standard training subset and inputted into an established constructed initial full convolution neural network (unet) for training until the network training stop condition is satisfied. In the training process of the initial full convolution neural network, the forward propagation, the calculation error and the backward propagation processes are included, and each forward propagation includes convolution, pooling and normalization steps.

After a training subset is trained on the network, the initial full convolution neural network is updated and the number of iterations is increased by one. At this time, the updated initial full convolution neural network may be verified using the verification image, if the verification result is higher than the training result of the verification image by the initial full convolution neural network updated after the previous training, then the updated initial full convolution neural network is saved and can be used for testing of a later test image.

If the number of iterations reaches a preset iteration number, it indicates that the network training stop condition is satisfied, the training ends, and the test image can be tested. If it is not reached, it is necessary to examine whether the training error of the full convolution neural network is effectively reduced after the iteration (i.e., after the training for the standard training subset is completed), that is, whether the training error is less than or equal to the preset error, if yes, it suggests an effective reduction, if not, the identification error is not effectively reduced, and at this time, the learning rate of the network can be adjusted. Subsequently, the trained full convolution neural network can be tested using the test image to obtain test results, and the segmentation accuracy of the trained full convolution neural network is determined according to the test results.

In the method of segmenting the abdominal image, the image is cut into squares, the intersection points of every four squares among the squares are moved, the image in each square is affine transformed, to effect data augmentation, which facilitates the full convolution neural network to extract texture features of the image. The existing solutions cannot do the learning corresponding to each pixel, they need to input a whole circle around each pixel at the same time which, however, will ignore the influence of the whole image on the pixel. In this embodiment, the segmentation task is applied to the unet. The network adaptively learns the features of the image by end-to-end learning, as well as by way of backward propagating the modified parameters.

In addition, the embodiment combines the original neural network to perform joint cooperative learning on two kinds of data with different labels and the same style. For pixel-level image labeling, tremendous manpower and time are required, and thus, the embodiment employs the architecture of the front feature extraction part of the full convolution neural network (i.e., convolution and pooling architecture), a multi-label training (corresponding to classification layer and fully connected layer) on the back-end feature combination part can make the neural network converge well. In addition, the trained full convolution neural network can favorably match the existing data well and obtain high accuracy without separate train networks for different populations (lean, normal, and obesity).

In the process of segmenting the abdominal image to be examined, the trained full convolution neural network is used to segment the image, so that the segmentation accuracy can be improved. Table 1 below shows the results of the accuracy of segmentation of abdominal images to examine using the method of segmenting of the embodiment.

TABLE 1

|  | Subcutaneous fat | Intra-abdominal fat |
| --- | --- | --- |
| With pixel-level labels (with pixel classification label images) | 94.3% | 90.8% |
| Only with the pixel number labels (with the number of pixels belonging to each class) | 93.6% | 88.7% |

In an embodiment, an apparatus of segmenting an abdominal image is provided, which includes an image to test acquiring module and a segmented image determining module:

The image to test acquiring module is configured to acquire an abdominal image to be examined;

The segmented image determining module is configured to classify pixels in the abdominal image to be examined based on a trained full convolution neural network, and determine a segmented image corresponding to the abdominal image to be examined; the trained full convolution neural network is trained and determined based on a first training set and a second training set, the first training set includes first sample abdominal images and pixel classification label images corresponding to the first sample abdominal images, the second training set includes second sample abdominal images and the number of pixels of second sample abdominal images correspondingly belong to each class.

In an embodiment, the apparatus further includes:

A acquiring set acquiring module, configured to obtain the first training set and the second training set;

An initializing module, configured to initialize an initial full convolution neural network, the initial full convolution neural network includes a convolution layer and a classification layer;

A training module, configured to train the initial full convolution neural network based on the first training set and the second training set to obtain the trained full convolution neural network;

During training the initial full convolution neural network based on the first training set, the initial full convolution neural network is updated according to a first training error, the first training error is determined according to a training pixel classification label image that is outputted from a classification layer by inputting a first sample abdominal image into the initial full convolution neural network and a pixel classification label image of the first sample abdominal image;

During training the initial full convolution neural network based on a second training set, the initial full convolution neural network is updated according to a second training error, the second train error is determined according to an output of a training convolution image through a fully connected layer and outputted from the convolution layer by inputting the second sample abdominal image in the second training set into the initial full convolution neural network and the number of pixels of the second sample abdominal images correspondingly belong to each class.

In an embodiment, the training module includes:

A subset determining module, configured to determining first training subsets based on the first training set and determining second training subsets based on the second training set;

A neural network training module configured to select alternately an untrained standard training subset from the first training subsets and the second training subsets, training the initial full convolution neural network based on the standard training subsets, and obtain the trained full convolution neural network. The standard training subsets selected in adjacent two rounds are from different training sets, respectively In an embodiment, the neural network training module includes:

A selecting module, configured to select a training subset from the first training subsets as a standard training subset.

An updating module, configured to train the initial full convolution neural network based on the standard training subset and updating the initial full convolution neural network;

A trained full convolution neural network determining module further configured to, when the network training stop condition is not satisfied, select an untrained training subset as a standard training subset from the training set in the first training set and, the second training set, and a training set other than the training set the to which the standard training subset belongs as a standard training subset, and return to the step of training the initial full convolution neural network based on the standard training subset, updating the initial full convolution neural network, until satisfying the network training stop condition is satisfied, and regard the updated initial full convolution neural network as the trained full convolution neural network.

In an embodiment, the apparatus further includes:

A standard marking module configured to mark the standard training subset as trained after the updating module updated the initial full convolution neural network and before satisfying the network training stop condition;

A first subset marking module, configured to respectively mark the first training subsets as untrained when the first training subsets are respectively marked as trained.

A second subset marking module configured to respectively mark the second training subsets as untrained when the second training subsets are respectively marked as trained.

In an embodiment, the training set acquiring module includes:

A first image acquiring module, configured to acquire first sample original abdominal gray scale images and pixel classification label images corresponding to the first sample original abdominal gray scale images;

A first image transforming module configured to transform the first sample original abdominal gray scale images to obtain first gray scale transformed images, and perform the same transformation to the pixel classification label images corresponding to the first sample original abdominal images, and obtain pixel classification label transformed images corresponding to the first gray scale transformed images;

A first training set generating module, configured generate to the first training set based on the first sample original abdominal gray scale images, the pixel classification label images corresponding to the first sample original abdominal gray scale images, the first gray scale transformed images, and the pixel classification label transformed images corresponding to the first gray scale transformed images.

In an embodiment, the first training set generating module includes:

A first channel image acquiring module, configured to acquire first channel images of each of the first sample original abdominal gray scale images on each of color channels and a second channel images of each of the first gray scale transformed images on each of the color channels;

A first normalizing module, configured to normalize the first channel images and the second image channel images to determine first normalized channel images and second normalized channel images;

A first training set determining module, configured to generate the first training set based on the first normalized channel images and the second normalized channel images.

In an embodiment, the training set acquiring module includes:

A second image acquiring module, configured to acquire the second sample original abdominal gray scale images and the number of pixels of second sample abdominal images correspondingly belong to each class;

A second image transforming module, configured to transform the second original abdominal gray scale images to obtain the second gray scale transformed images;

A second training set generating module configured to generate the second training set based on the second sample original abdominal gray scale images, the second gray scale transformed images, and the number of pixels of second sample abdominal images correspondingly belong to each class.

In an embodiment, the apparatus further include:

A square determining module, configured to, before training the initial full convolution neural network to obtain the trained full convolution neural network based on the first training set and the second training set by the training module, determine squares corresponding to the first sample abdominal images based on the first sample abdominal images in the first training set;

A movable point determining module, configured to regard an intersection points of each four squares corresponding to the first sample abdominal image as a movable point;

A quadrilateral determining module, configured to move the movable points, updating the squares to obtain quadrilaterals;

A first affine transforming module, configured to perform affine transformation to the regions of the first sample abdominal image in each of the quadrilateral to obtain affine sub-graphs;

A first joining module, configured to join the affine sub-graphs to obtain an updated first sample abdominal image;

A first updating module, configured to update the first training set based on the updated first sample abdominal images.

In an embodiment, the apparatus further includes:

A segmentation square determining module, configured to, before training the initial full convolution neural network to obtain the trained full convolution neural network based on the first training set and the second training set by the training module, determine segmentation squares corresponding to the second sample abdominal images based on the second sample abdominal images in the second training set;

A movable intersection determining module, configured to regard an intersection point of four segmentation squares corresponding to the second sample abdominal image as a movable point;

A segmentation quadrilateral determining module, configured to move the movable points, update the segmentation squares to obtain segmentation quadrilaterals;

A second affine transforming module, configured to perform affine transformation to the regions of the second sample abdominal image in each of the segmentation quadrilaterals respectively to obtain abdominal affine sub-graphs;

A second joining module, configured to join the affine sub-graphs to obtain an updated second sample abdominal image; and A second updating module, configured to update the second training set based on the updated second sample abdominal images.

The segmentation squares can be determined by segmenting the second sample abdominal image, and the process is similar to the above-described segmentation process for the first sample abdominal image. The updated second training set includes updated second sample abdominal images, the training is subsequently performed using the updated second training set.

Figure 4:
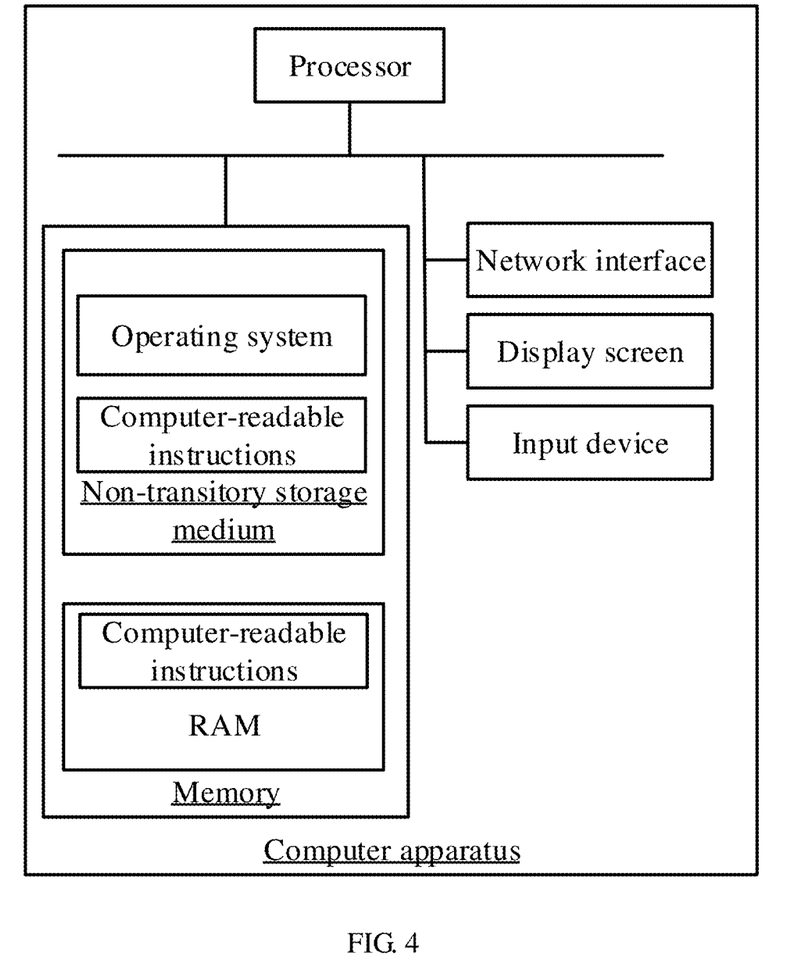
FIG. 4 is a block diagram of a computer apparatus according to another embodiment.

In an embodiment, the apparatus of segmenting an abdominal image provided herein may be implemented in the form of a computer program that may be run on a computer apparatus as shown in FIG. 4. The non-transitory storage medium of the computer apparatus may store various program modules constituting the apparatus of segmenting an abdominal image, such as an image to examine acquiring module and a segmented image determining module. Computer-executable instructions are included in the various program modules for causing the computer apparatus to perform steps in the method of segmenting an abdominal image of various embodiments of the present application described in this specification, e.g., the computer apparatus may acquire the abdominal image to be examined by the image to examine acquiring module, and then classify pixels in the abdominal image to be examined based on the trained full convolution neural network by the segmented image determining module and determine a segmented image corresponding to the abdominal image to be examined; the trained full convolution neural network is trained and determined based on a first training set and a second training set, the first training set including first sample abdominal images and pixel classification label images corresponding to the first sample abdominal images, the second training set includes the second sample abdominal images and the number of pixels of second sample abdominal images correspondingly belong to each class.

FIG. 4 is a block diagram of a computer apparatus according to an embodiment. As shown in FIG. 4, the computer apparatus includes a processor, a memory, and a network interface connected through a system bus. The memory includes a non-transitory storage medium and a random access memory (RAM). The non-transitory storage medium of the computer apparatus stores an operating system and may also store computer-executable instructions that, when executed by the processor, cause the processor to implement the method of segmenting an abdominal image described above. The RAM may also store computer-executable instructions that, when executed by the processor, may cause the processor to perform the method of segmenting an abdominal image. In an example, the computer apparatus may further include an input device and a display screen, the display screen of the computer apparatus may be a liquid crystal display screen or an electronic ink display screen, the input device of the computer apparatus may be a touch layer overlaid on the display screen, it can also be a key board, a trackball, or a touch pad provided on the computer apparatus housing, or an external keyboard, a touch pad, or a mouse.

Those skilled in the art will appreciate that the structure shown in FIG. 4 is merely a block diagram of a portion of the structure associated with the solution of the present disclosure, and does not constitute a limitation on the computer apparatus to which the solution of the present disclosure is applied, a particular computer apparatus may include more or less components, or combine certain components, or with a different arrangement of components.

In an embodiment, a compute device is provided, which includes a memory storing computer-executable instructions and a processor, when the computer-executable instructions are executed by the processor, the processor is caused to perform the steps of: acquiring an abdominal image to be examined; and classifying pixels in the abdominal image to be examined based on a trained full convolution neural network, and determining a segmented image corresponding to the abdominal image to be examined, the trained full convolution neural network is trained and determined based on a first training set and a second training set, the first training set includes first sample abdominal images and pixel classification label images corresponding to the first sample abdominal images, the second training set includes second sample abdominal images and the number of pixels of second sample abdominal images correspondingly belong to each class.

In an embodiment, the determining the trained initial full convolution neural network includes: acquiring the first training set and the second training set; initializing and obtaining the initial full convolution neural network, the initial full convolution neural network includes a convolution layer and a classification layer; and training the initial full convolution neural network based on the first training set and the second training set to obtain the trained full convolution neural network;

During training the initial full convolution neural network based on the first training set, the initial full convolution neural network is updated according to a first training error, the first training error is determined according to a training pixel classification label image that is outputted from a classification layer by inputting a first sample abdominal image into the initial full convolution neural network and a pixel classification label image of the first sample abdominal image;

During training the initial full convolution neural network based on a second training set, the initial full convolution neural network is updated according to a second training error, the second train error is determined according to an output of a training convolution image through a fully connected layer and outputted from the convolution layer by inputting the second sample abdominal image in the second training set into the initial full convolution neural network and the number of pixels of the second sample abdominal images correspondingly belong to each class.

In an embodiment, the step of training the initial full convolution neural network based on the first training set and the second training set to obtain the trained full convolution neural network includes: determining first training subsets based on the first training set and determining second training subsets based on the second training set; and selecting alternately an untrained standard training subset from the first training subsets and the second training subsets, training the initial full convolution neural network based on the standard training subsets, and obtaining the trained full convolution neural network. The standard training subsets selected in adjacent two rounds are from different training sets, respectively.

In an embodiment, the obtaining the trained full convolution neural network includes: selecting a training subset from the first training subsets as a standard training subset; training the initial full convolution neural network based on the standard training subset, and updating the initial full convolution neural network; when the network training stop condition is not satisfied, selecting an untrained training subset from the first training set, the second training set, and a training set other than the training set to which the standard training subset belongs as a standard training subset, returning to the step of training the initial full convolution neural network based on the standard training subset, updating the initial full convolution neural network, until the network training stop condition is satisfied, and regarding the updated initial full convolution neural network as the trained full convolution neural network.

In an embodiment, when the computer-executable instructions are executed by the processor, after updating the initial full convolution neural network and before satisfying the network training stop condition performed by the processor, the processor is further caused to perform: marking the standard training subset as trained; marking respectively the first training subsets as untrained when the first training subsets are respectively marked as trained; and marking respectively the second training subsets as untrained when the second training subsets are respectively marked as trained.

In an embodiment, the acquiring the first training set includes: acquiring first sample original abdominal gray scale images and pixel classification label images corresponding to the first sample original abdominal gray scale images; transforming the first sample original abdominal gray scale images to obtain first gray scale transformed images, and performing the same transformation to the pixel classification label images corresponding to the first sample original abdominal images, and obtaining pixel classification label transformed images corresponding to the first gray scale transformed images; and generating the first training set based on the first sample original abdominal gray scale images, the pixel classification label images corresponding to the first sample original abdominal gray scale images, the first gray scale transformed images, and the pixel classification label transformed images corresponding to the first gray scale transformed images.

In an embodiment, the generating the first training set includes: acquiring first channel images of each of the first sample original abdominal gray scale images on each of color channels and a second channel images of each of the first gray scale transformed images on each of the color channels; normalizing the first channel images and the second image channel images to determine first normalized channel images and second normalized channel images; and generating the first training set based on the first normalized channel images and the second normalized channel images.

In an embodiment, the acquiring the second training set includes: acquiring the second sample original abdominal gray scale images and the number of pixels of second sample abdominal images correspondingly belong to each class; transforming the second original abdominal gray scale images to obtain the second gray scale transformed images; and generating the second training set based on the second sample original abdominal gray scale images, the second gray scale transformed images, and the number of pixels of second sample abdominal images correspondingly belong to each class.

In an embodiment, when the computer-executable instructions are executed by the processor, before training the initial full convolution neural network to obtain the trained full convolution neural network based on the first training set and the second training set performed by the processor, the processor is further caused to perform: determining squares corresponding to the first sample abdominal images based on the first sample abdominal images in the first training set; regarding an intersection points of each four squares corresponding to the first sample abdominal image as a movable point; moving the movable points, updating the squares to obtain quadrilaterals; performing affine transformation to the regions of the first sample abdominal image in each of the quadrilateral to obtain affine sub-graphs; joining the affine sub-graphs to obtain an updated first sample abdominal image; and updating the first training set based on the updated first sample abdominal images.

In an embodiment, when the computer-executable instructions are executed by the processor, before training the initial full convolution neural network to obtain the trained full convolution neural network based on the first training set and the second training set, the processor is further caused to perform: determining segmentation squares corresponding to the second sample abdominal images based on the second sample abdominal images in the second training set; regarding an intersection point of four segmentation squares corresponding to the second sample abdominal image as a movable point; moving the movable points, updating the segmentation squares to obtain segmentation quadrilaterals; performing affine transformation to the regions of the second sample abdominal image in each of the segmentation quadrilaterals respectively to obtain abdominal affine sub-graphs; joining the affine sub-graphs to obtain an updated second sample abdominal image; and updating the second training set based on the updated second sample abdominal images.

The segmentation squares can be determined by segmenting the second sample abdominal image, and the process is similar to the above-described segmentation process for the first sample abdominal image. The updated second training set includes updated second sample abdominal images, the training is subsequently performed using the updated second training set.

A storage medium storing computer-executable instructions that, when executed by one or more processors, cause the one or more processors to perform the steps of: acquiring an abdominal image to be examined; and Classifying pixels in the abdominal image to be examined based on a trained full convolution neural network, and determining a segmented image corresponding to the abdominal image to be examined, the trained full convolution neural network is trained and determined based on a first training set and a second training set, the first training set includes first sample abdominal images and pixel classification label images corresponding to the first sample abdominal images, the second training set includes second sample abdominal images and the number of pixels of second sample abdominal images correspondingly belong to each class.

In an embodiment, the determining the trained full convolution neural network includes: acquiring the first training set and the second training set; initializing and obtaining the initial full convolution neural network, the initial full convolution neural network includes a convolution layer and a classification layer; and training the initial full convolution neural network based on the first training set and the second training set to obtain the trained full convolution neural network;

During training the initial full convolution neural network based on the first training set, the initial full convolution neural network is updated according to a first training error, the first training error is determined according to a training pixel classification label image that is outputted from a classification layer by inputting a first sample abdominal image into the initial full convolution neural network and a pixel classification label image of the first sample abdominal image;

During training the initial full convolution neural network based on a second training set, the initial full convolution neural network is updated according to a second training error, the second train error is determined according to an output of a training convolution image through a fully connected layer and outputted from the convolution layer by inputting the second sample abdominal image in the second training set into the initial full convolution neural network and the number of pixels of the second sample abdominal images correspondingly belong to each class.

In an embodiment, the step of training the initial full convolution neural network based on the first training set and the second training set to obtain the trained full convolution neural network includes: determining first training subsets based on the first training set and determining second training subsets based on the second training set; and selecting alternately an untrained standard training subset from the first training subsets and the second training subsets, training the initial full convolution neural network based on the standard training subsets, and obtaining the trained full convolution neural network; the standard training subsets selected in adjacent two rounds are from different training sets, respectively.

In an embodiment, the obtaining the trained full convolution neural network includes: selecting a training subset from the first training subsets as a standard training subset; training the initial full convolution neural network based on the standard training subset, and updating the initial full convolution neural network; when the network training stop condition is not satisfied, selecting an untrained training subset from the first training set, the second training set, and a training set other than the training set to which the standard training subset belongs as a standard training subset, returning to the step of training the initial full convolution neural network based on the standard training subset, updating the initial full convolution neural network, until the network training stop condition is satisfied, and regarding the updated initial full convolution neural network as the trained full convolution neural network.

In an embodiment, when the computer-executable instructions are executed by the processor, after updating the initial full convolution neural network and before satisfying the network training stop condition performed by the processor, the processor is further caused to perform: marking the standard training subset as trained; marking respectively the first training subsets as untrained when the first training subsets are respectively marked as trained; and marking respectively the second training subsets as untrained when the second training subsets are respectively marked as trained.

In an embodiment, the acquiring the first training set includes: acquiring first sample original abdominal gray scale images and pixel classification label images corresponding to the first sample original abdominal gray scale images; transforming the first sample original abdominal gray scale images to obtain first gray scale transformed images, and performing the same transformation to the pixel classification label images corresponding to the first sample original abdominal images, and obtaining pixel classification label transformed images corresponding to the first gray scale transformed images; and generating the first training set based on the first sample original abdominal gray scale images, the pixel classification label images corresponding to the first sample original abdominal gray scale images, the first gray scale transformed images, and the pixel classification label transformed images corresponding to the first gray scale transformed images.

In an embodiment, the generating the first training set includes: acquiring first channel images of each of the first sample original abdominal gray scale images on each of color channels and a second channel images of each of the first gray scale transformed images on each of the color channels; normalizing the first channel images and the second image channel images to determine first normalized channel images and second normalized channel images; and generating the first training set based on the first normalized channel images and the second normalized channel images.

In an embodiment, the acquiring the second training set includes: acquiring the second sample original abdominal gray scale images and the number of pixels of second sample abdominal images correspondingly belong to each class; transforming the second original abdominal gray scale images to obtain the second gray scale transformed images; and generating the second training set based on the second sample original abdominal gray scale images, the second gray scale transformed images, and the number of pixels of second sample abdominal images correspondingly belong to each class.

In an embodiment, when the computer-executable instructions are executed by the processor, before training the initial full convolution neural network to obtain the trained full convolution neural network based on the first training set and the second training set performed by the processor, the processor is further caused to perform: determining squares corresponding to the first sample abdominal images based on the first sample abdominal images in the first training set; regarding an intersection points of each four squares corresponding to the first sample abdominal image as a movable point; moving the movable points, updating the squares to obtain quadrilaterals; performing affine transformation to the regions of the first sample abdominal image in each of the quadrilateral to obtain affine sub-graphs; joining the affine sub-graphs to obtain an updated first sample abdominal image; and updating the first training set based on the updated first sample abdominal images.

In an embodiment, when the computer-executable instructions are executed by the processor, before training the initial full convolution neural network to obtain the trained full convolution neural network based on the first training set and the second training set, the processor is further caused to perform: determining segmentation squares corresponding to the second sample abdominal images based on the second sample abdominal images in the second training set; regarding an intersection point of four segmentation squares corresponding to the second sample abdominal image as a movable point; moving the movable points, updating the segmentation squares to obtain segmentation quadrilaterals; performing affine transformation to the regions of the second sample abdominal image in each of the segmentation quadrilaterals respectively to obtain abdominal affine sub-graphs; joining the affine sub-graphs to obtain an updated second sample abdominal image; and updating the second training set based on the updated second sample abdominal images.

The segmentation squares can be determined by segmenting the second sample abdominal image, and the process is similar to the above-described segmentation process for the first sample abdominal image. The updated second training set includes updated second sample abdominal images, the training is subsequently performed using the updated second training set.

It should be understood that although the steps are sequentially displayed as indicated by arrows, these steps are not necessarily sequentially performed as indicated by arrows. Unless explicitly stated herein, the execution of these steps is not strictly sequential, and the steps may be performed in other sequences. Moreover, at least a part of the steps may include a plurality of sub-steps or stages that are not necessarily performed at the same time, but may be performed at different times, and the order of execution of the sub-steps or stages is not necessarily performed sequentially, but may be performed in turn or alternately with at least a part of other steps or sub-steps or stages of other steps.

Persons of ordinary skill in the art understand that all or part of the processes in the methods of the foregoing embodiments may be implemented by a computer program instructing relevant hardware. The computer program may be stored in a non-transitory computer-executable storage medium. When the computer program is executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchronous Link DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be object to the protection scope of the claims.

What is claimed is:

1. A method of segmenting an abdominal image, the method being implemented by a computer apparatus, the method comprising:
    acquiring an abdominal image to be examined; and
    classifying pixels in the abdominal image to be examined based on a trained full convolution neural network, and determining a segmented image corresponding to the abdominal image to be examined;
    wherein the trained full convolution neural network is trained and determined based on a first training set and a second training set, the first training set comprises first sample abdominal images and pixel classification label images corresponding to the first sample abdominal images, the second training set comprises second sample abdominal images and the number of pixels of second sample abdominal images correspondingly belong to each class;
    wherein the determining the trained full convolution neural network comprises:
        acquiring the first training set and the second training set;
        initializing and obtaining the initial full convolution neural network, the initial full convolution neural network comprising a convolution layer and a classification layer; and
        training the initial full convolution neural network based on the first training set and the second training set to obtain the trained full convolution neural network;
    wherein during training the initial full convolution neural network based on the first training set, the initial full convolution neural network is updated according to a first training error, the first training error is determined according to a training pixel classification label image that is outputted from a classification layer by inputting a first sample abdominal image into the initial full convolution neural network, and a pixel classification label image of the first sample abdominal image;
    wherein during training the initial full convolution neural network based on a second training set, the initial full convolution neural network is updated according to a second training error, the second train error is determined according to an output of a training convolution image through a fully connected layer and outputted from the convolution layer by inputting the second sample abdominal image in the second training set into the initial full convolution neural network, and the number of pixels of the second sample abdominal images correspondingly belong to each class.

2. The method of segmenting the abdominal image according to claim 1, wherein the step of training the initial full convolution neural network based on the first training set and the second training set to obtain the trained full convolution neural network comprises:
    determining first training subsets based on the first training set and determining second training subsets based on the second training set; and
    selecting alternately an untrained standard training subset from the first training subsets and the second training subsets, training the initial full convolution neural network based on the standard training subsets, and obtaining the trained full convolution neural network;
    wherein the standard training subsets selected in adjacent two rounds are from different training sets, respectively.

3. The method of segmenting an abdominal image according to claim 2, wherein the obtaining the trained full convolution neural network comprises:
    selecting a training subset from the first training subsets as a standard training subset;
    training the initial full convolution neural network based on the standard training subset, and updating the initial full convolution neural network;
    when the network training stop condition is not satisfied, selecting an untrained training subset from the first training set, the second training set, and a training set other than the training set to which the standard training subset belongs as a standard training subset, returning to the step of training the initial full convolution neural network based on the standard training subset, updating the initial full convolution neural network, until the network training stop condition is satisfied, and regarding the updated initial full convolution neural network as the trained full convolution neural network.

4. The method of segmenting an abdominal image according to claim 3, wherein after updating the initial full convolution neural network and prior to satisfying the network training stop condition, the method further comprises:
    marking the standard training subset as trained;
    marking respectively the first training subsets as untrained when the first training subsets are respectively marked as trained; and
    marking respectively the second training subsets as untrained when the second training subsets are respectively marked as trained.

5. The method of segmenting an abdominal image according to claim 1, wherein the acquiring the first training set comprises:
    acquiring first sample original abdominal gray scale images and pixel classification label images corresponding to the first sample original abdominal gray scale images;
    transforming the first sample original abdominal gray scale images to obtain first gray scale transformed images, and performing the same transformation to the pixel classification label images corresponding to the first sample original abdominal images, and obtaining pixel classification label transformed images corresponding to the first gray scale transformed images; and
    generating the first training set based on the first sample original abdominal gray scale images, the pixel classification label images corresponding to the first sample original abdominal gray scale images, the first gray scale transformed images, and the pixel classification label transformed images corresponding to the first gray scale transformed images.

6. The method of segmenting an abdominal image according to claim 5, wherein the generating the first training set comprises:
    acquiring first channel images of the first sample original abdominal gray scale images on each of color channels and second channel images of the first gray scale transformed images on each of the color channels;

normalizing the first channel images and the second image channel images to determine first normalized channel images and second normalized channel images; and generating the first training set based on the first normalized channel images and the second normalized channel images.

7. The method of segmenting an abdominal image according to claim 5, wherein the acquiring the second training set comprises:

acquiring second sample original abdominal gray scale images and the number of pixels of the second sample abdominal images correspondingly belong to each class;

transforming the second original abdominal gray scale images to obtain the second gray scale transformed images; and generating the second training set based on the second sample original abdominal gray scale images, the second gray scale transformed images, and the number of pixels of second sample abdominal images correspondingly belong to each class.

8. The method of segmenting an abdominal image according to claim 1, wherein prior to training the initial full convolution neural network to obtain the trained full convolution neural network based on the first training set and the second training set, the method further comprises:

determining squares corresponding to the first sample abdominal images based on the first sample abdominal images in the first training set;

regarding an intersection points of each four squares corresponding to the first sample abdominal image as a movable point;

moving the movable points, updating the squares to obtain quadrilaterals;

performing affine transformation to regions of the first sample abdominal image in each of the quadrilateral to obtain affine sub-graphs;

joining the affine sub-graphs to obtain an updated first sample abdominal image; and updating the first training set based on the updated first sample abdominal images.

9. A computer apparatus, comprising a memory and a processor, the memory stores computer-executable instructions that, when executed by the processor, causing the processor to perform a method comprising:

acquiring an abdominal image to be examined; and classifying pixels in the abdominal image to be examined based on a trained full convolution neural network, and determining a segmented image corresponding to the abdominal image to be examined;

wherein the trained full convolution neural network is trained and determined based on a first training set and a second training set, the first training set comprises first sample abdominal images and pixel classification label images corresponding to the first sample abdominal images, the second training set comprises second sample abdominal images and the number of pixels of second sample abdominal images correspondingly belong to each class;

wherein the determining the trained initial full convolution neural network comprises:

acquiring the first training set and the second training set;

initializing and obtaining the initial full convolution neural network, the initial full convolution neural network comprising a convolution layer and a classification layer; and training the initial full convolution neural network based on the first training set and the second training set to obtain the trained full convolution neural network;

wherein during training the initial full convolution neural network based on the first training set, the initial full convolution neural network is updated according to a first training error, the first training error is determined according to a training pixel classification label image that is outputted from a classification layer by inputting a first sample abdominal image into the initial full convolution neural network and a pixel classification label image of the first sample abdominal image;

wherein during training the initial full convolution neural network based on a second training set, the initial full convolution neural network is updated according to a second training error, the second train error is determined according to an output of a training convolution image through a fully connected layer and outputted from the convolution layer by inputting the second sample abdominal image in the second training set into the initial full convolution neural network and the number of pixels of the second sample abdominal images correspondingly belong to each class.

10. The computer apparatus according to claim 9, wherein the step of training the initial full convolution neural network based on the first training set and the second training set to obtain the trained full convolution neural network comprises:

determining first training subsets based on the first training set and determining second training subsets based on the second training set; and selecting alternately an untrained standard training subset from the first training subsets and the second training subsets, training the initial full convolution neural network based on the standard training subsets, and obtaining the trained full convolution neural network;

wherein the standard training subsets selected in adjacent two rounds are from different training sets, respectively.

11. The computer apparatus according to claim 10, wherein the obtaining the trained full convolution neural network comprises:

selecting a training subset from the first training subsets as a standard training subset;

training the initial full convolution neural network based on the standard training subset, and updating the initial full convolution neural network; and when the network training stop condition is not satisfied, selecting an untrained training subset from the first training set, the second training set, and a training set other than the training set to which the standard training subset belongs as a standard training subset, returning to the step of training the initial full convolution neural network based on the standard training subset, updating the initial full convolution neural network, until the network training stop condition is satisfied, and regarding the updated initial full convolution neural network as the trained full convolution neural network.

12. The computer apparatus according to claim 11, wherein, after updating the initial full convolution neural network and prior to satisfying the network training stop condition, the method further comprises:
  marking the standard training subset as trained;
  marking respectively the first training subsets as untrained when the first training subsets are respectively marked as trained; and
  marking respectively the second training subsets as untrained when the second training subsets are respectively marked as trained.

13. The computer apparatus according to claim 9, wherein the acquiring the first training set comprises:
  acquiring first sample original abdominal gray scale images and pixel classification label images corresponding to the first sample original abdominal gray scale images;
  transforming the first sample original abdominal gray scale images to obtain first gray scale transformed images, and performing the same transformation to the pixel classification label images corresponding to the first sample original abdominal images, and obtaining pixel classification label transformed images corresponding to the first gray scale transformed images; and
  generating the first training set based on the first sample original abdominal gray scale images, the pixel classification label images corresponding to the first sample original abdominal gray scale images, the first gray scale transformed images, and the pixel classification label transformed images corresponding to the first gray scale transformed images.

14. The computer apparatus according to claim 13, wherein the generating the first training set comprises:
  acquiring first channel images of each of the first sample original abdominal gray scale images on each of color channels and a second channel images of each of the first gray scale transformed images on each of the color channels;
  normalizing the first channel images and the second image channel images to determine first normalized channel images and second normalized channel images; and
  generating the first training set based on the first normalized channel images and the second normalized channel images.

15. The computer apparatus according to claim 13, wherein the acquiring the second training set comprises:
  acquiring the second sample original abdominal gray scale images and the number of pixels of second sample abdominal images correspondingly belong to each class;
  transforming the second original abdominal gray scale images to obtain the second gray scale transformed images; and
  generating the second training set based on the second sample original abdominal gray scale images, the second gray scale transformed images, and the number of pixels of second sample abdominal images correspondingly belong to each class.

16. The computer apparatus according to claim 9, wherein prior to training the initial full convolution neural network to obtain the trained full convolution neural network based on the first training set and the second training set, the method further comprises:
  determining squares corresponding to the first sample abdominal images based on the first sample abdominal images in the first training set;
  regarding an intersection points of each four squares corresponding to the first sample abdominal image as a movable point;
  moving the movable points, updating the squares to obtain quadrilaterals;
  performing affine transformation to regions of the first sample abdominal image in each of the quadrilateral to obtain affine sub-graphs;
  joining the affine sub-graphs to obtain an updated first sample abdominal image; and
  updating the first training set based on the updated first sample abdominal images.

17. One or more non-transitory storage medium storing computer-executable instructions that, when executed by one or more processors, cause the one or more processors to perform a method comprising:
  acquiring an abdominal image to be examined; and
  classifying pixels in the abdominal image to be examined based on a trained full convolution neural network, and determining a segmented image corresponding to the abdominal image to be examined;
  wherein the trained full convolution neural network is trained and determined based on a first training set and a second training set, the first training set comprises first sample abdominal images and pixel classification label images corresponding to the first sample abdominal images, the second training set comprises second sample abdominal images and the number of pixels of second sample abdominal images correspondingly belong to each class;
  wherein the determining the trained initial full convolution neural network comprises:
    acquiring the first training set and the second training set;
    initializing and obtaining the initial full convolution neural network, the initial full convolution neural network comprising a convolution layer and a classification layer; and
    training the initial full convolution neural network based on the first training set and the second training set to obtain the trained full convolution neural network;
  wherein during training the initial full convolution neural network based on the first training set, the initial full convolution neural network is updated according to a first training error, the first training error is determined according to a training pixel classification label image that is outputted from a classification layer by inputting a first sample abdominal image into the initial full convolution neural network and a pixel classification label image of the first sample abdominal image;
  wherein during training the initial full convolution neural network based on a second training set, the initial full convolution neural network is updated according to a second training error, the second train error is determined according to an output of a training convolution image through a fully connected layer and outputted from the convolution layer by inputting the second sample abdominal image in the second training set into the initial full convolution neural network and the number of pixels of the second sample abdominal images correspondingly belong to each class.

* * * * *